(12) United States Patent
Cumme et al.

(10) Patent No.: US 11,473,746 B2
(45) Date of Patent: Oct. 18, 2022

(54) LIGHTING DEVICE FOR A VEHICLE

(71) Applicant: Carl Zeiss Jena GmbH, Jena (DE)

(72) Inventors: Matthias Cumme, Jena (DE); Arnaud Deparnay, Erfurt (DE); Roman Kleindienst, Weimar (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 17/279,964

(22) PCT Filed: Sep. 25, 2019

(86) PCT No.: PCT/EP2019/075811
§ 371 (c)(1),
(2) Date: Mar. 25, 2021

(87) PCT Pub. No.: WO2020/064803
PCT Pub. Date: Apr. 2, 2020

(65) Prior Publication Data
US 2022/0034464 A1     Feb. 3, 2022

(30) Foreign Application Priority Data
Sep. 26, 2018   (DE) ..................... 10 2018 123 789.8

(51) Int. Cl.
*F21S 41/24*     (2018.01)
*F21S 41/143*    (2018.01)
*F21S 41/20*     (2018.01)
*G02B 5/02*      (2006.01)

(52) U.S. Cl.
CPC .............. *F21S 41/24* (2018.01); *F21S 41/143* (2018.01); *F21S 41/285* (2018.01); *G02B 5/0278* (2013.01)

(58) Field of Classification Search
CPC ........ F21S 41/24; F21S 41/143; F21S 41/285; F21S 41/25; F21S 41/265; F21S 41/275; G02B 5/0278; G02B 3/08; G02B 19/0028; G02B 19/0066; F21V 7/0091
See application file for complete search history.

(56) References Cited

U.S. PATENT DOCUMENTS

| 10,816,155 B2 | 10/2020 | Cumme et al. |
| 2002/0080615 A1 | 6/2002 | Marshall et al. |

(Continued)

FOREIGN PATENT DOCUMENTS

| CN | 202902151 U | * 4/2013 | ................ F21V 5/04 |
| CN | 103797595 A | * 5/2014 | ............ A01G 7/045 |

(Continued)

OTHER PUBLICATIONS

International Search Report from corresponding International Patent Application No. PCT/EP19/75811, dated Jan. 2, 2020.

(Continued)

*Primary Examiner* — Erin Kryukova
(74) *Attorney, Agent, or Firm* — Kusner & Jaffe

(57) ABSTRACT

A lighting device is provided, comprising a spatially extended light source with a light-emitting surface greater than 0.5 mm$^2$ and also an aspherical TIR lens, which is configured to collimate light from the spatially extended light source, and a refractive diffuser configured to generate a lighting distribution on the basis of the collimated light.

22 Claims, 6 Drawing Sheets

(56) References Cited

U.S. PATENT DOCUMENTS

| | | | | |
|---|---|---|---|---|
| 2003/0202241 | A1* | 10/2003 | Blumel | F21V 5/007 359/365 |
| 2008/0043466 | A1* | 2/2008 | Chakmakjian | F21V 5/04 362/237 |
| 2009/0168414 | A1* | 7/2009 | Bailey | F21V 5/002 362/231 |
| 2009/0290371 | A1* | 11/2009 | Yagi | F21S 41/143 362/518 |
| 2012/0075870 | A1* | 3/2012 | Kayanuma | F21V 5/045 362/333 |
| 2012/0229611 | A1 | 9/2012 | Cohen et al. | |
| 2013/0134456 | A1 | 5/2013 | Lu | |
| 2013/0265772 | A1 | 10/2013 | Lu et al. | |
| 2014/0313758 | A1* | 10/2014 | Nakaya | F21S 41/322 362/516 |
| 2016/0195243 | A1* | 7/2016 | Dross | F21V 7/048 362/297 |
| 2018/0024337 | A1* | 1/2018 | Dross | G02B 19/0061 359/634 |

FOREIGN PATENT DOCUMENTS

| | | | | |
|---|---|---|---|---|
| DE | 102010031861 A1 | * | 1/2012 | ......... G02B 19/0028 |
| DE | 102016117967 A1 | | 3/2018 | |
| DE | 102019124115 A1 | * | 3/2020 | ............. B60Q 3/30 |
| EP | 0641967 A1 | | 3/1995 | |
| FR | 2919913 A1 | | 2/2009 | |
| WO | WO2015/173814 A2 | | 11/2015 | |

OTHER PUBLICATIONS

Matthias Cumme et al: "Abstract", Advanced Optical Technologies, vol. 4, No. 1, Jan. 6, 2015 (Jan. 6, 2015), pp. 47-61, XP055344225, ISSN: 2192-8576, DOI: 10.1515/aot-2014-0062.
Anonymous: "Double Light: White Chip LED Technical Data Sheet", Dec. 9, 2005 (Dec. 9, 2005), pp. 1-11, XP055656605.
Search Report (English translation) from German Patent Application No. 102018123789.8 dated Jul. 25, 2019.

* cited by examiner

LIGHTING DEVICE FOR A VEHICLE

FIELD OF THE INVENTION

The present application relates to lighting devices for vehicles.

BACKGROUND OF THE INVENTION

In the field of illumination technology for vehicles, lighting devices must meet numerous complex requirements. These requirements sometimes contradict one another and in many cases require compromises.

For example, there are high requirements with regard to energy efficiency as well as tight specifications in the boundary conditions, for example cost pressure, service life requirements, and installation space restrictions, e.g., due to the space requirements of other vehicle components and aerodynamic considerations. The quality requirements relating to the provided lighting distribution, described by what is known as the lighting function, increase continuously and are characterized for example in the field of front headlights by the desire for illumination functions for broad spectral ranges, for example white light, with complex, high-resolution illumination distribution that is defined in dependence on the solid angle. In many fields of application, in particular asymmetric illumination functions are required, for example in the case of low beam and cornering lights. Achromatic properties of the illumination devices are likewise required here, for example to avoid color fringes and overly bright areas, so-called "hot spots," when illuminating the road so as to avoid disturbing vehicle drivers and other road users. An example of such disturbances are blue color fringes, which could be confused in the case of moving vehicles for example with warning signals from emergency vehicles, known as round beacon lights. Corresponding requirements may be found for other vehicle lighting devices, for example tail lights, fog lights, daytime running lights, brake lights, or turn signal lights.

In order to meet efficiency requirements, light emitting diodes (LEDs) may be used as light sources. Due to the achievable luminance of LEDs and the need to dissipate thermal power losses, high-power LEDs also have larger radiation surfaces as their luminous power increases. In currently available systems, for example, the radiation surface is 2.1×1 mm$^2$ with a luminous flux of 600 lumens and 4.4 mm$^2$ with a luminous flux of 1200 lumens. Such extended radiation surfaces emitting in a large solid angle range are more difficult to collimate as the surface area increases, that is to say, even after collimation, the radiation has a residual divergence that is usually too high to permit the realization of the desired illumination functions. If the residual divergence is too great, high-resolution beam shaping is made significantly more difficult.

Thus, efficiency and brightness requirements and the requirement for a long service life conflict with the requirement for minimum residual divergence. On the other hand, the requirement for improved collimation of an extended light source is in conflict, for example, with the requirement relating to the limited installation space. Furthermore, the desired achromatic properties make it necessary that the beam shaping system has as few chromatic aberrations as possible, which may likewise come into conflict with installation space requirements and cost requirements.

FR 2 919 913 discloses a light source in combination with a collimator for a point light source and a device for beam shaping, in particular for implementing a fog light, tail light, or brake light. The collimator is, for example, in this case a TIR (total internal reflection) lens, a Fresnel lens, or a dome lens that ideally generates parallel rays for an idealized point light source. FR 2 919 913, however, does not disclose anything relating to how to deal with a finitely extended light source and the problem of the aforementioned hot spots, such as those that may be caused by the use of holographic diffusers, as described in FR 2 919 913, having zero or higher orders of diffraction.

Lighting devices that use mirrors for beam shaping are also known from the prior art. However, such known arrangements often do not meet requirements with regard to small installation space and low costs.

In order to meet the requirement for achromatic properties at the same time, the collimation and beam shaping system should not have any chromatic aberrations if possible. This would be possible, for example, if the beam shaping and the collimation were implemented by way of reflection optical units (e.g., concave mirror for collimation and a segmented mirror system for beam shaping). However, such an arrangement could likewise go against the requirement for installation space and cost reduction.

SUMMARY OF THE INVENTION

It is therefore the object of the invention to provide an improved lighting device that simultaneously meets the abovementioned requirements to a relatively great extent:

A lighting device as claimed in claim 1 is provided for this purpose. The dependent claims define further embodiments.

The lighting device comprises a spatially extended light source with a lighting surface greater than 0.5 mm$^2$. Furthermore, the lighting device comprises an aspherical TIR lens that is configured to collimate light from the spatially extended light source, and a refractive diffuser that is configured to generate a lighting distribution on the basis of the collimated light.

A TIR (total internal reflection) lens is understood to mean an optical apparatus that passes on at least part of the incident light rays by way of total internal reflection. TIR lenses will be explained in more detail below.

An aspherical lens is understood to mean a lens in which at least one of the refractive surfaces has a surface deviating from a spherical or planar shape.

A refractive diffuser is a per se known component, which has refractive, scattering, or diffractive properties on a surface. In the present application, refractive diffusers are understood to mean diffusers with smooth surface profile shapes that contain no jump discontinuities and whose properties are dominated by the refraction of light. Typically, such diffusers have a "smooth" "freeform surface," calculated by way of wave optics, with a statistical surface profile.

In the case of such a diffuser, the light rays emitted by each location, for example on a surface of the diffuser (the location may be specified by x, y coordinates), yield the desired lighting distribution in their totality.

In some examples, the refractive diffuser may comprise a plurality of surface portions, each of which contains all of the information required for beam shaping. If, for example, in the case of such refractive diffusers, a single surface portion is illuminated, the desired lighting distribution is produced in the far field. The surface portions may have sizes of 300-1000 μm, for example. All surface portions may be calculated here in such a way that they contain stochastically distributed structures. Furthermore, all surface portions may be embodied in such a way that they are statistically independent of one another. In addition, all surface portions may be embodied in such a way that they may be continuously joined to one another without creating visible borders. In particular, it is possible in this way to avoid that there are jump discontinuities at the joined surface portions, and in particular it is possible to ensure that the refractive diffuser is continuously differentiable over a plurality of surface portions.

The use of statistically independent surface portions may have the advantage that inhomogeneities that arise as a result of the speckles (sometimes also referred to as light granulation or speckle patterns) that occur on diffusers with partially coherent light may be significantly reduced. In addition, embodying the surface portions as continuously differentiable surfaces that may be joined to one another in a continuously differentiable manner may have the advantage that scattering centers are avoided, as a result of which the efficiency and the achievable contrast may be increased.

The calculation of such structures, which are also referred to as continuous or refractive phase elements, is explained, for example, in J. Néauport et al., Applied Optics, vol. 42, no. 13, pages 2377 ff. or in K.-H. Brenner et al, Diffractive optics and microoptics (DOMO) 2000: Conference Edition; OSA Technical Digest, pages 237 ff., ISBN 1-55752-635-4.

As a result of using the refractive diffuser, a great freedom in terms of design may be obtained for the lighting device in the case of a relatively small installation space. This allows installation space to be minimized. In addition, in contrast to diffractive diffusers, a refractive diffuser cannot have a technology-related zero order of diffraction and no undesired higher orders of diffraction. As a result, the occurrence of undesired light effects such as hot spots and illumination inhomogeneities may be avoided.

An ideal lighting device may be approximated by such a lighting device. Such an ideal lighting device would consist of the following components: a completely collimatable light source, for example a point light source, a collimator that ensures ideal collimation- and a high-resolution achromatic beam shaping optical unit with a complex, low-scatter beam shaping function. The advantages of the apparatus described that make it possible to approximate such an ideal lighting device are described below.

In some examples, the refractive diffuser is an achromatic refractive diffuser.

Achromatic is understood to mean that the change in the light path, for example due to refraction, is substantially not dependent on the wavelength of the light. This may apply in particular to a range of wavelengths, for example to a specific wavelength range, for example to the visible wavelength range.

Achromatic properties of such refractive diffusers are described in M. Cumme and A. Depamay, Advanced Optical Technologies, vol. 4, issue 1, pages 47-61, 2004. These are based on a specific combination of diffractive and refractive properties at which an opposite angle dispersion is used to compensate chromatic aberrations. These achromatic properties make it possible to provide an improved lighting distribution that is for example free from color fringes, for example blue color fringes in white light, as is described above.

The refractive diffusers described above potentially have a significantly higher efficiency than all other known diffusers. They may therefore be suitable to satisfy the desire for increased efficiency in the field of vehicle illumination. This also makes it possible to achieve high brightness or a high overall performance.

In some examples, the achromatic refractive diffuser has an optical diffuser surface that is configured to provide the lighting distribution on the basis of the collimated light, wherein the diffuser surface is continuously differentiable.

This may have the advantage that such a continuously differentiable, "smooth" shape of the diffuser surface may significantly reduce or even completely avoid the occurrence of zero orders of diffraction in the lighting distribution. Such diffusers also offer a very high efficiency of typically 93% to 97% transmission even with large beam angles, for example with a numerical aperture NA of up to 0.7, for example at 633 nm. Phase jumps of the transmitted light are also avoided owing to the continuously differentiable shape. As a result, no technology-related zero orders of diffraction or scattering effects occur. The design freedom when creating the optical diffuser allow almost any, even asymmetric, far-field distribution.

It may thus be possible to provide illumination functions with a lighting distribution that is complex, of high resolution, and/or defined in a solid-angle-dependent manner. Such illumination functions may in particular go beyond simple geometric shapes such as circles, ellipses, and squares. In some examples, the illumination functions may have smooth transitions in intensity; in other examples, the illumination functions may have sharp transitions in intensity. A combination is also possible. For example, the intensity may have soft transitions in a first angle direction, but have hard transitions in a second angle direction perpendicular to the first angle direction.

A hard transition may be understood to mean, for example, a change in intensity by >50%, for example by >75%, for example >85% in a solid angle range that corresponds to the full width at half maximum (FWHM) solid angle range of the illumination. A soft transition may be understood to mean, for example, a change in intensity by <50%, for example <25%, for example <15%, for example <5%, for example <3% in a solid angle range that corresponds to the FWHM solid angle range of the illumination.

The FWHM solid angle range of the illumination is understood to mean that solid angle range which is fully illuminated by the illumination arrangement described further above, consisting of a spatially extended LED and TIR lens, and which contains only those illumination angles at which the intensity is greater than half the maximum intensity.

In some embodiments, the refractive diffuser may be embodied in such away that any residual divergence that occurs during its illumination and is created, for example, by the system consisting of an extended LED light source and a TIR lens is taken into account in the optical design. This may have the advantage that the deviation in the illumination angle distribution due to the residual divergence is reduced. This allows the system to be designed in such a way that an ideal lighting device is more closely approximated. As a result, the lighting distribution may have an improved quality.

In some examples, the diffuser surface has stochastically distributed structures with convex and concave structure parts, wherein the structure parts have typical lateral dimensions of 15 μm-500 μm.

This may make inexpensive production with high quality of the lighting distribution possible, for example because manufacturing using methods suitable for mass production, for example by way of injection molding production, is possible. The minimum structure size may already be limited in the design process, which means that molding tools may be more durable and demolding during the molding process may be improved. Proceeding in this manner during the calculation may also allow production to take place with low-resolution optical lithographic methods, for example laser beam writing with 1-μm resolution, which may likewise reduce the production costs. These factors may contribute to a cost reduction with the same or even increased quality of the lighting distribution.

It should be noted that some of the refractive diffusers in optical design offer a choice of profile height and lateral structure size of the element structures while maintaining the angular distribution produced, wherein the profile height and lateral structure size represent coupled variables that are proportional to one another. This is known as scalability of the design. For example, a specified illumination angle distribution A could be produced with a diffuser B in which the average structure depth is, for example, 3 μm and the average lateral structure size is 50 μm. With a scalable design, it is possible to produce the same illumination angle distribution A with a scaled diffuser C, in which the average structure depth is, for example, 6 μm and the average lateral structure size is correspondingly 100 μm.

The above-described scalability that may be applied to refractive diffusers allows a freedom in terms of design that may be used for embodying them as achromatic refractive diffusers. In this way, chromatically caused deflection angle errors may be compensated through the combination of light diffraction and light refraction. In every diffuser, light is deflected at all locations on its illuminated surface. Light may be deflected both by diffraction, e.g., at a blazed grating (cf. https://de.wikipedia.org/w/index.php?title=Blazegitter&oldid=175256423, retrieved on Aug. 16, 2018), and also by refraction, e.g., at the prism. However, the deflections of light caused by refraction or diffraction show opposite changes in the deflection angle when the wavelength changes. Thus the deflection angle caused by refraction with normal dispersion, for example in optical glasses in the visible wavelength range, becomes smaller when the wavelength increases. By contrast, the deflection angle caused by diffraction increases when the wavelength increases. If a prism and a blazed grating were illuminated with a white light beam and the orientation of both elements were such that the light were deflected in the same direction, a color spectrum would be visible downstream of both elements, but both color profiles would be oriented mirror-symmetrically to each other.

If a blazed grating, as described above, were considered to be a scalable element and if the profile depth and the period of a blazed grating were to be increased proportionally to one another bit by bit, the grating would initially have a purely diffractive effect. In the case of an extremely large period and a correspondingly increased profile depth, for example if the light beam were to illuminate only a few or only one period, the diffractive effect would disappear and the optical effect would then be determined only by the refractive effect. Accordingly, there is an intermediate area in which both a refractive effect and a diffractive effect occur. If this area is selected or the period and profile depth are set in a manner such that the refractive and diffractive effects are of the same magnitude, color correction is possible due to the opposite dependence of the deflection angle on the wavelength.

This principle may also be used for color correction in refractive diffusers whose structure sizes are scalable. Such diffusers have a structure size at which both diffraction and refraction occur, and the structure size is selected in such a way that the wavelength dependencies of the local deflection angles compensate one another. In particular achromatic refractive diffusers, as described above, may have an optical design that is based on the considerations described. In contrast to blazed gratings, it is furthermore possible in the case of achromatic refractive diffusers to avoid a technology-related zero-order diffraction maximum.

Such achromatic refractive diffusers may therefore have the advantage that color fringes when illuminating the road may be avoided.

In some embodiments, the refractive diffuser comprises at least one region that contains a hybrid structure, wherein the hybrid structure comprises a combination of an achromatic refractive diffuser with a globally acting diffractive structure.

The refractive diffuser may here be an achromatic refractive diffuser as a whole or in part. In such cases, the hybrid structure may also lie outside the areas of the refractive diffuser in which the refractive diffuser is an achromatic refractive diffuser. Areas of the refractive diffuser that do not have a hybrid structure may also be achromatic refractive diffuser areas.

The at least one region may here be a part of the refractive diffuser or may also comprise the entire refractive diffuser. It is also possible for a plurality of regions with hybrid structures that may overlap and/or may be spaced apart from one another to be present.

A globally acting diffractive structure is understood here to mean that the structure exerts a diffractively acting optical function on light that passes through the globally acting diffractive structure, wherein all local areas of the structure deflect the light in such a way that the deflection has a specified relationship to all other areas. Specified relationship to all other areas means, for example, that all light rays that pass through the global structure intersect at one location or at a plurality of locations that are located, for example, on a circular line. This one location or the plurality of locations may also be a virtual point or a plurality of virtual points, as is known, for example, in the case of diverging lenses.

This may be provided, for example, by a diffractively acting lens, for example by a Fresnel lens, but the use of other diffractively acting structures is also possible. Acting globally may mean in this case that the diffractive effect influences the angular distribution of incoming light not only locally but globally, for example on a scale of at least 20%, for example at least 40%, for example at least 60%, for example at least 80%, for example 100% of the dimensions of the globally acting diffractive structure. Such a global effect may manifest itself, for example, in the focusing of parallel incident light on one point.

Such a globally acting diffractive structure may be configured such that a color angle spectrum of the light collimated by the aspherical TIR lens may be reduced. This may be achieved, for example, by optimizing the diffractive structure taking into account the color angle spectrum of the light collimated by the TIR lens, for example by way of optimization calculations as described below. It may also be possible to optimize the TIR lens and the globally acting diffractive structure together. The quality of the lighting distribution may be further improved as a result.

Such a globally acting diffractive structure and/or hybrid structure may, in contrast to the previously described refractive diffuser structures, include places of discontinuity. These may be optimized with regard to a center wavelength, for example for a center wavelength $\lambda$. The center wavelength may be described by $\lambda=\frac{1}{2}(\lambda_{max}+\lambda_{min})$, where $\Delta_{max}$ gives the maximum wavelength and $\lambda_{min}$ gives the minimum wavelength of the spectral range for which the achromatic correction is sought. The globally acting diffractive structure may be designed in such a way that $2\pi*n$ jump discontinuities result for light with the center wavelength λ, wherein in particular n=1 may be selected. But other substantially integer values for n are also possible. Such jump discontinuities in the global refractive structure may lead to the occurrence of a zero order of diffraction, which may be disadvantageous, as already explained above. However, since the jump discontinuities of the global refractive structure in the hybrid structure work in combination with an achromatic refractive diffuser, the jump discontinuities may each have a different, for example randomly distributed, phase angle owing to a combination with the achromatic refractive diffuser, in particular if the latter is embodied stochastically, but also in other embodiments. Thus, all the light contributions occurring at the jump discontinuities, which could lead to a zero-order diffraction image in the lighting distribution, may be mutually compensated for at least substantially, preferably completely, on average by interference.

A combination of an achromatic refractive diffuser with a globally acting diffractive structure is understood here to mean that the two elements are combined. This may be done, for example, by superposing profiles of the two structures, for example by superposing height profiles of the two structures, for example by means of addition. In other embodiments, the hybrid structure may be composed of different optical components, which are arranged for example one behind the other so that the combination only results from the passing light.

In some embodiments, the globally acting diffractive structure comprises a Fresnel lens.

Here it may be possible to embody the hybrid structure in such a way that a color correction is effected by the hybrid structure, for example if chromatic aberrations arise due to the collimation. This may be effected by a determination of the chromatic properties of the aspherical TIR lens and their incorporation as input parameters into the optical design of the hybrid structure.

In some examples, the spatially extended light source is configured to provide white light as the light.

White light is here understood to mean light that has a combination of different spectral ranges so that a white color impression is created for the human eye.

In some examples, the light source comprises a light-emitting diode and/or a laser diode. The light source may further comprise a phosphor target. As a result of this, a cost-effective provision of a light source with sufficient coherence is possible. It may also be possible to achieve a long service life for the components.

In some examples, the lighting distribution may have one or a plurality of the following shapes: a symmetric shape, an asymmetric shape, a round shape, a square shape, an elliptical shape.

Here, a plurality of the above shapes is to be understood to mean that some shapes may have a combination of the forms mentioned. For example, an elliptical shape may have symmetric properties, for example mirror symmetry along the main axes. The lighting distribution may also have a combination of the shapes mentioned, for example, an elliptical shape in a first area and a round shape in a second area, which may be different from the first area. However, other combinations are also possible.

In some examples, the lighting distribution has one or a plurality of the following intensity distributions: a homogeneous intensity distribution, a top-hat-shaped intensity distribution, a Gaussian intensity distribution, a super-Gaussian intensity distribution.

A plurality of the intensity distributions means here that the intensity distribution combines different aspects, for example for specific solid angle ranges. For example, an asymmetric intensity distribution may be achieved by superimposing a top-hat-shaped intensity distribution with a super-Gaussian intensity distribution. As a result, asymmetric intensity distributions may be provided that meet the requirements of road traffic and, in some examples, avoid a hard transition from illuminated to non-illuminated areas.

In addition, the lighting distribution may be designed in such a way that sharp contours arise in some locations. For example, letterings or specific characters such as arrows that show a strong contrast when projected onto the roadway may thus be generated. Likewise, the illuminated areas may contain any mathematically defined brightness modulations, i.e., brightness changes over the lighting distribution.

In some embodiments, the aspherical TIR lens is not rotationally symmetric.

For example, for a spatially extended light source that has an asymmetric, for example rectangular, shape, the collimation may be improved by a non-rotationally symmetric TIR lens compared to a rotationally symmetric TIR lens. This will be explained in greater detail later.

In some examples, the input coupling surfaces, i.e., the surfaces facing the light source, of the TIR lens enclose as large an area as possible around the extended light source and thus ensure that radiation emanating from the light source is coupled into the TIR lens in the largest possible solid angle range, for example substantially a half-space around the light source.

Substantially comprising a half-space around an area is understood to mean that the spatially extended light source occupies a major part of the solid angle range of the half-space, for example 80%, for example 85%, for example 90%, for example 95%, for example 100% of the solid angle range of the half-space. This may have the advantage that a major part of the light emitted by the spatially extended light source is received and collimated by the TIR lens, which prevents losses and thus improves the efficiency of the system.

In some examples, the spatially extended light source has a shape comprising a first length in a first direction and a second length in a second direction that differs from the first direction. The first length is greater than the second length.

In some examples, the shape of the light source may be a rectangular shape with a first side length and a second side length, wherein the first length is the first side length and the second length is the second side length.

This may have the advantage that industrially available light sources may be used and that other properties of the light source, for example heat dissipation, may be improved due to the shape, which may improve the service life and efficiency.

In some examples, the aspherical TIR lens has a first extent in the first direction and a second extent in the second direction, wherein the first extent is greater than the second extent.

This may have the advantage that the TIR lens shaped in this way has improved optical properties compared to a TIR lens that is not adapted to the shape of the spatially extended light source, i.e., a collimation adapted in the first and second directions.

In some examples, the aspherical TIR lens is configured to produce a substantially rotationally symmetric collimation of the spatially extended light source.

A rotationally symmetric collimation is understood here to mean that the deviation from an ideal collimation has a rotational symmetry with respect to the optical axis of the TIR lens, for example is constant in the absolute value of the deviation angle with respect to the ideal collimation. A substantially rotationally symmetric collimation is accordingly understood to mean that the deviation is substantially constant, e.g., smaller than 20%, e.g., smaller than 10, e.g., smaller than 5%, in particular smaller than 1%.

In the idealized case of a point light source, it is possible to use an aspherical lens to achieve perfect collimation with an angular deviation from the optical axis of 0°.

In the case of an extended light source in a plane perpendicular to the optical axis, this is no longer possible. In an arbitrarily chosen sectional plane perpendicular to the optical axis, the angular deviation, also known as the local divergence angle, with respect to the optical axis is proportional to the extent of the light source in relation to the lens diameter in the sectional plane perpendicular to the optical axis and to the reciprocal focal length of the lens.

In the case of an asymmetric light source, the extent of the light source depends on the selection of the sectional plane perpendicular to the optical axis. The local divergence angle is therefore also dependent on the selection of the sectional plane.

Since the TIR lens has a first extent in the first direction and a second extent in the second direction, wherein the first extent is greater than the second extent, this effect may now at least partially be compensated.

For example, in the case of an elliptical light source, an elliptical shape of the TIR lens may be selected so that the divergence angle is again the same for all sectional planes, because in the sectional planes in which the light source has a greater extent, the TIR lens likewise has a larger extent.

In the case of an angular light source, for example a rectangular light source, this property may substantially likewise be achieved. An elliptical shape of the TIR lens may likewise be selected here in order to take into account the different extents of the light source in different directions and to improve the collimation. In order to additionally reduce the influence of such deviations, the focal length of the TIR lens may be increased, wherein an optimization process may be carried out here together with other conflicting requirements, for example structural volume.

The elliptical shape of the TIR lens is only an example of non-rotationally symmetric shapes of the TIR lens.

In some embodiments, a different non-rotationally symmetric shape of the aspherical TIR lens may also be selected. Here, the non-rotationally symmetric shape of the TIR lens may be selected depending on the shape of the spatially extended light source.

In some embodiments, a shape of the aspherical TIR lens may be based on a shape of the spatially extended light source.

For example, for an elliptical shape or a rectangular shape of the spatially extended light source, a TIR lens may have an elliptical shape in the sectional plane perpendicular to the optical axis.

The above-mentioned procedures may have the advantage that improved collimation may be achieved in the same installation space.

This may have the advantage that the extended shape of the TIR lens may reduce the influence of the asymmetry of an asymmetric, spatially extended light source on the collimation.

In some examples, the aspherical TIR lens includes an axis, a first surface, a second surface, an exit surface, and a reflector surface, wherein the axis extends through the spatially extended light source, the exit surface is planar and extends perpendicularly to the axis, wherein the exit surface provides the collimated light, the first surface has a bi-aspheric shape and intersects the axis, the second surface has a free form and does not intersect the axis, and wherein the reflector surface has a parabolic shape.

In the examples in which the TIR lens has a first extent, which is greater than a second extent, the shapes may be defined in a sectional plane that extends through the axis, for example in a cross-sectional plane of the TIR lens. In other sectional planes, the shapes may likewise be deformed in accordance with the deformation of the TIR lens compared to the cross-sectional plane in these planes, as is known in the field of computer-aided design (CAD) example from loft features.

In some examples, the shapes are centered shapes, in other examples they are decentered shapes, for example the first surface may have a decentered bi-aspheric shape. Here, the bi-aspheric shape may be different for different sectional planes through the TIR lens that extend through the axis.

In some embodiments, TIR lenses with a first and second surface, as described above, are combined with hybrid structures, as described above in connection with embodiments of the refractive diffusers. In these embodiments, the at least one region may fill at least part of a projection of the first surface and/or the second surface onto the refractive diffuser. The projection may take place along the axis. However, the projection may also take place by means of ray tracing of the light, wherein a projection onto a part of the refractive diffuser may be determined by following a light beam emanating from the light source and determining the area in which the light beam traverses the refractive diffuser, wherein the area thus determined may then be determined as the at least one region.

In some examples, the aspherical TIR lens comprises a joint region between the first and the second surface, wherein the joint region has a surface shape that does not fall below a production radius and is designed such that a light component from the spatially extended light source that extends through the joint region is deflected in such a way that the corresponding light component does not fall into a solid angle range downstream of the TIR lens so as to significantly influence the overall lighting distribution downstream of the diffuser.

The fact that the light component deflected by the joint region does not significantly influence the lighting distribution is understood to mean that the light component substantially does not significantly influence a lighting distribution that is generated without light passing through the joint region. This may mean that the solid-angle-dependent intensity of the lighting distribution downstream of the diffuser is changed for no solid angle due to the light component that passes through the joint region by, for example, more than 20%, for example 15%, for example 10%, for example 5%, for example 1%, based on the desired solid-angle-dependent intensity downstream of the diffuser.

The aforementioned criteria and target specifications may be taken into account by a person skilled in the art when creating the optical design, for example by specifying these targets as optimization targets for numerical optimization processes for optical design software on the basis of ray tracing, for example as a "merit function" in the optical design software Zemax OpticStudio.

A production radius is understood to mean the smallest possible curvature that may still be produced with a production process, for example owing to tool sizes or owing to material properties.

This may have the advantage that a cost optimization of the production costs is achieved by virtue of the fact that a suitable production radius is already taken into account in the design phase. In particular, the influence of light from the joint region on the lighting distribution should be minimized or the joint region should be designed in such a way that the light emanating therefrom is transferred into the used distribution in a targeted manner. In this way it may be avoided that light that passes through the joint region leads to the formation of hot spots in the lighting distribution, which could be the case, for example, as a result of a reflection at the joint region and a subsequent reflection in the TIR lens. In some examples, the lighting distribution may be prevented from having an undesirable distance dependency due to uncollimated light from the joint region.

In some embodiments, the proportion of light which passes through the joint region and is directed in the direction of the exit surface is over 95%.

The light component may also constitute other proportions, for example in the range between 70% and 100%. In many cases, a higher proportion is desirable, but lower values may also be useful in the context of an optimization process, for example to allow larger production radii and thus cheaper production, as long as the resulting lighting distribution meets the requirements.

Since the joint region is included in the optical design, it is possible that such a lighting device may be produced using inexpensive methods. Some inexpensive production processes, for example injection molding, are characterized by the fact that certain production radii cannot be undershot, as demolding of radii that are too small may lead to unpredictable effects related to light deflection. This is not limited to injection molding, but also applies to numerous other production processes.

In some embodiments, the free form of the second surface is defined by means of Q polynomials.

Q polynomials are known, for example, from I. Kaya et al., Comparative assessment of freeform polynomials as optical surface descriptions, OPTICS EXPRESS 22683, vol. 20, no. 20, 24 Sep. 2012. The freeform definition by means of Q polynomials has the advantage that a numerical optimization of the free form and/or other forms becomes more robust and simple.

In some embodiments, the Q polynomials may be decentered Q polynomials. For decentering the Q polynomials, offset values should be provided for the location coordinates corresponding to the required decentering, i.e., lateral shift. As a result, the surfaces described by Q polynomials are shifted relative to the optical axis, which results in additional degrees of freedom for the optical design.

In some embodiments, the aspherical TIR lens and the refractive diffuser may be formed in one piece as one component. Here, the refractive diffuser may in some embodiments be formed in one piece with the exit surface of the aspherical TIR lens.

This may have the advantage that the manufacturing costs may be reduced. At the same time, due to the production in one piece, an exact and reproducible fit between the TIR lens and the refractive diffuser may be achieved. In this way, errors in the arrangement of these components with respect to one another may be avoided and it may be possible to dispense with any adjustment of components.

This may have the advantage that production is particularly simple and therefore particularly cost-effective.

In some embodiments, the aspherical TIR lens and/or the refractive diffuser may be produced by means of an injection molding method.

In some embodiments, the lighting device may be embodied as a lighting device for a vehicle. In this case, the lighting device may be embodied, for example, as a front headlight, a high beam, a fog light, a low beam, a tail lamp, or a daytime running light. Use as a different lighting device is also possible. The lighting device may be used advantageously in particular when the achromatic properties are advantageous. This is the case, for example, in the case of lighting devices that are intended to provide broad spectral ranges of the light, for example for white light. But other constellations are also conceivable, for example a lighting device for a combined brake light and direction indicator, wherein the brake light is intended to emit light in the red spectral range and the indicator is intended to emit light in the yellow spectral range, which may likewise be advantageously implemented by a lighting device according to the invention.

BRIEF DESCRIPTION OF THE DRAWINGS

For an improved understanding, embodiments are explained in greater detail below with reference to the accompanying drawings. In the drawings:

FIG. 3A shows a cross-sectional view and FIG. 3B shows a frontal view of the TIR lens, each with corresponding markings of the partial areas of the TIR lens.

DETAILED DESCRIPTION OF THE INVENTION

Various embodiments are now explained in detail below. This detailed description should not be construed as restrictive. In particular, a description of an embodiment with a plurality of features, components or details should not be interpreted to the effect that all these features, components and details are necessary for implementation. Variations and modifications that have been described for one of the embodiments are also applicable to other embodiments, unless indicated otherwise. Moreover, features of different embodiments may be combined with one another in order to form further embodiments.

Figure 1:
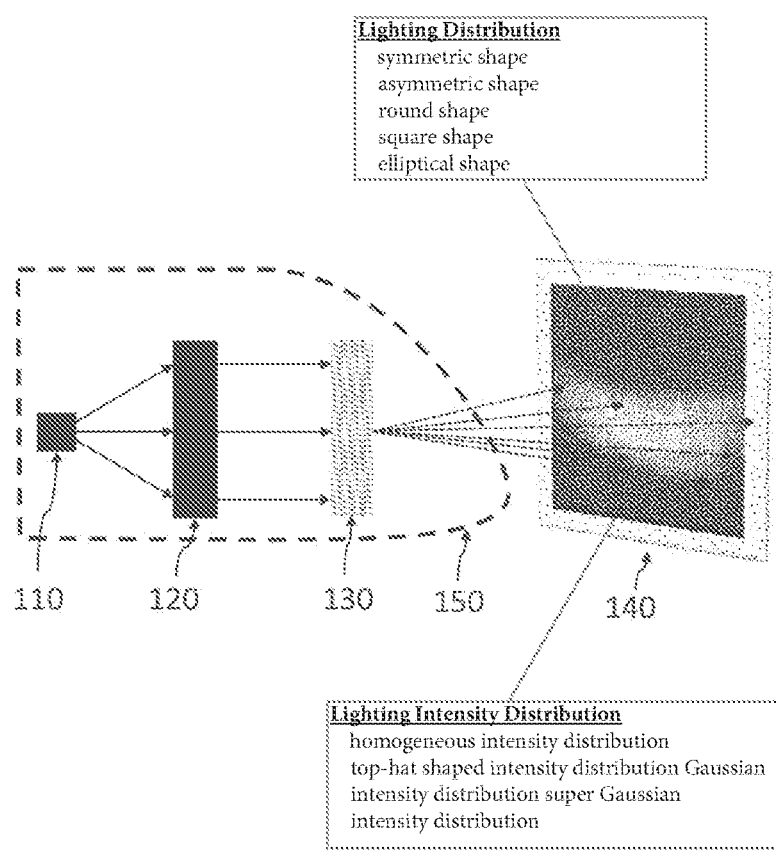
FIG. 1 shows a lighting device according to an embodiment.

FIG. 1 shows a lighting device according to an embodiment. The light from a spatially extended light source 110 is collimated by an aspherical TIR (total internal reflection) lens 120 and reshaped by a refractive diffuser 130 in order to generate a lighting distribution 140 on the basis of the collimated light. In some embodiments, a protective layer 150, for example made of glass, which protects the construction 110, 120, 130 from environmental influences, may additionally be present. In other embodiments, the protective layer 150 may be designed in one piece with the refractive diffuser 130. The spatially extended light source 110 has a light-emitting surface greater than 0.5 mm². In some embodiments, the spatially extended light source 110 is implemented as a light-emitting diode (LED) or groups of LEDs. This will be explained in more detail below in connection with FIG. 2. In the embodiment of FIG. 1, the refractive diffuser 130 is a divergence-adapted achromatic refractive diffuser. The lighting distribution 140 shown in FIG. 1 is a defined asymmetric high-resolution white lighting distribution.

Figure 2:
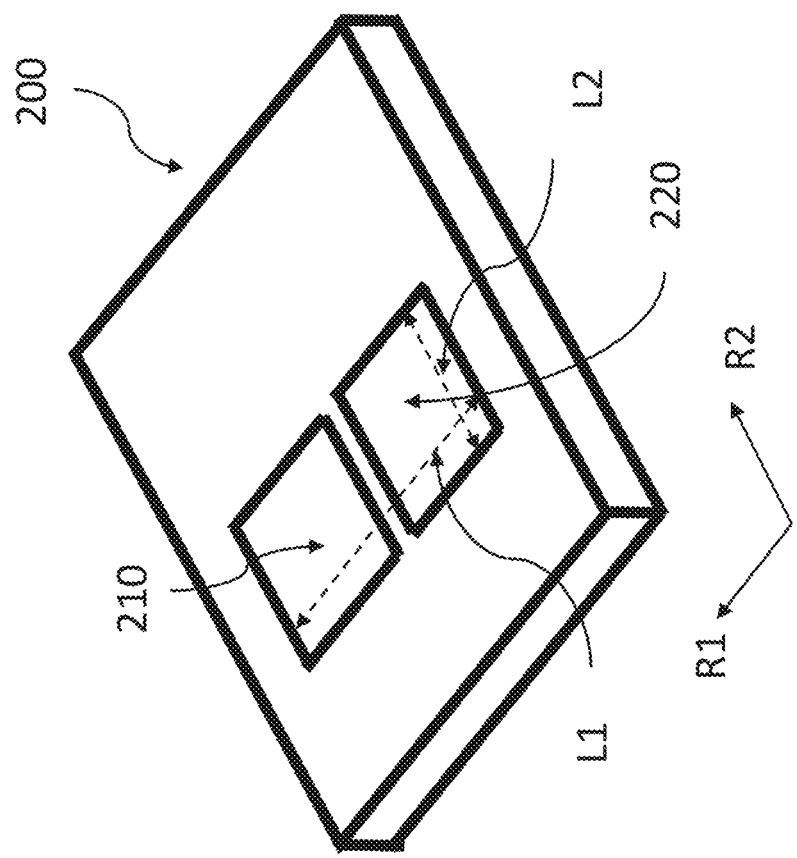
FIG. 2 shows a spatially extended light source with a light-emitting surface according to an embodiment.

FIG. 2 shows a spatially extended light source with a light-emitting surface according to an embodiment. FIG. 2 shows a spatially extended light source 200, which comprises a first LED 210 and a second LED 220. The spatially extended light source 200 may be described by a first direction R1 and in a second direction R2, wherein the spatially extended light source is extended in the first direction R1 and the second direction R2. The spatially extended light source 200 has a first length L1 in the first direction R1 and a second length L2 in the second direction R2. In the example shown in FIG. 2, the first length L1 is greater than the second length L2, resulting in a rectangular shape of the light source 200 in the example of FIG. 2. As previously described, it may be a challenge to collimate such an extended light source. Such a collimation may be achieved in an efficient form by way of the TIR lenses described below in connection with FIGS. 3A and 3B.

Figures 3A, 3B:
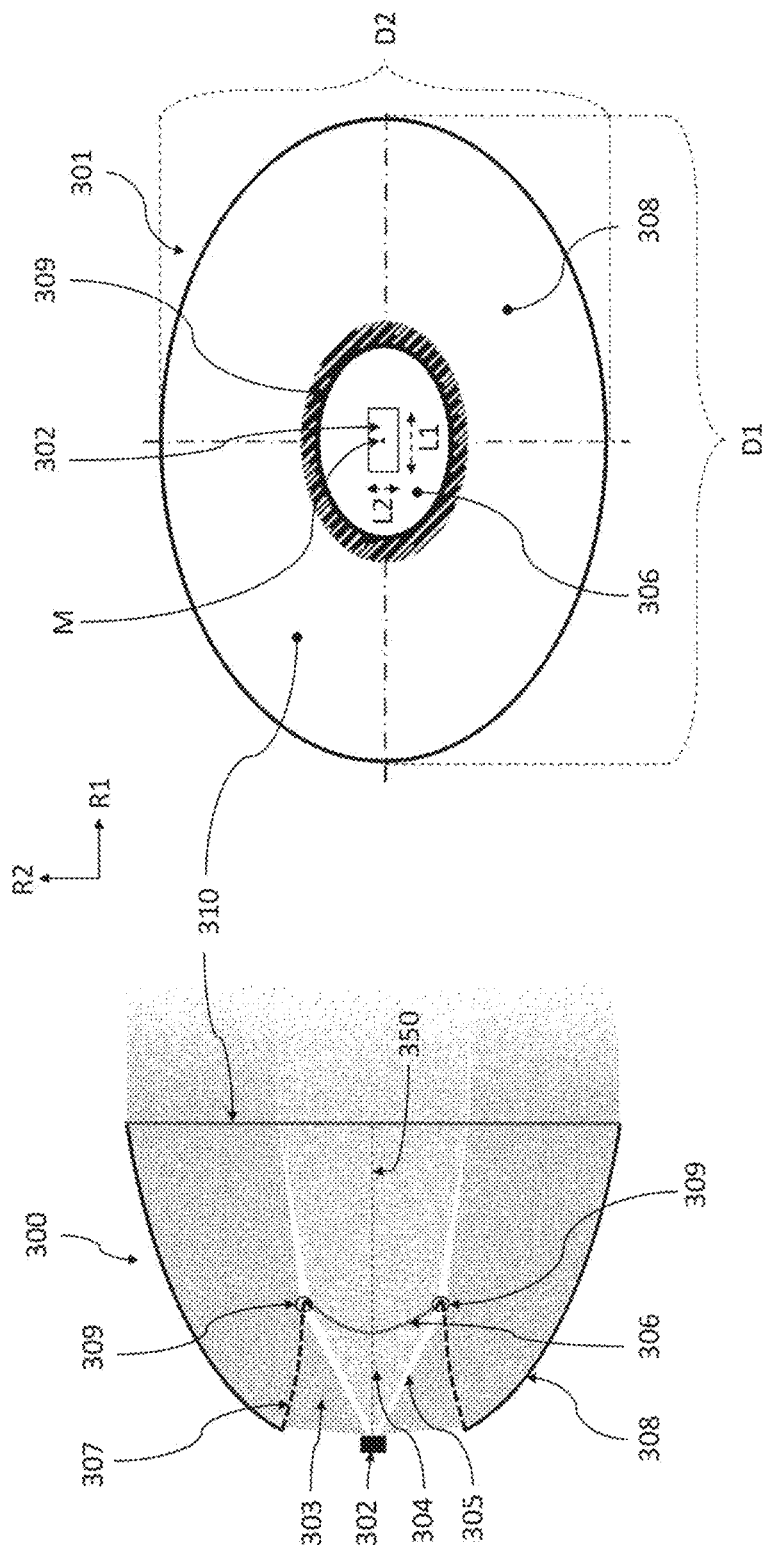
FIGS. 3A and 3B show a TIR lens according to an embodiment; in this case.

FIGS. 3A and 3B show a TIR lens 300, 301 according to an embodiment, wherein FIG. 3A shows a cross-sectional view 300 of the TIR lens and FIG. 3B showing a frontal view 301 of the TIR lens. The TIR lens 300, 301 is configured to provide collimated light from the light source 302. In the example shown, the light source 302 is an LED, which may correspond to the light source 200 of FIG. 2. However, different light sources 302 are also possible. In the example shown, the light source 302 has a rectangular shape with a first length L1 and second length L2 that differ from one another, wherein the first length L1 may extend in a first direction R1 and the second length L2 may extend in a second direction L2. The lengths and directions may correspond to the lengths and directions of FIG. 2.

In order to improve the quality of the collimation of the spatially extended light-emitting surface, the TIR lens 300, 301 is shaped asymmetrically. In the embodiment shown, the TIR lens is elliptically shaped and has around the center point M a first extent D1 in the first direction R1 and a second extent D2 in the second direction R2. The first extent D1 is greater than the second extent D2.

Due to the asymmetric shape of the TIR lens 300, 301, it may be possible for the construction to meet the requirements for the lighting device 100 and to provide an angular distribution in the angle range downstream of the collimator that has the smallest possible residual divergence that is as uniform as possible in all directions.

The cross-sectional view of FIG. 3A shows two different beam entry surfaces for the light from the spatially extended light source 302, namely a first surface 306 and a second surface 307, as well as an exit surface 310 and a reflector surface 308. The axis 350 extending through the center point M extends through the spatially extended light source 302. In the embodiment shown, the exit surface 310 has a planar shape and extends perpendicularly to the axis 350, wherein the exit surface 310 provides the collimated light. The first surface 306 and the second surface 307 are shaped independently of one another. In the embodiment, the first surface 306 has a bi-aspheric shape and intersects the axis 350. By contrast, the second surface 307 has a free form and does not intersect the axis 350. The reflector surface 308 has a paraboloid shape in the cross-sectional view 300. The planar shape of the exit surface 310 has the advantage that, in some examples, this surface may be formed in one piece with the refractive diffuser. This may make it possible for a collimation diffuser module to be produced in a single injection molding process. The two surfaces 306, 307 enclose a half-space around the spatially extended light source and thus ensure that a large part of the radiation is coupled into the transparent material of the TIR lens. As a result, even radiation components in angle ranges that are far away from the axis are recorded, whereby the efficiency of the apparatus is increased.

The TIR lens is shaped here in such a way that the surfaces are each as perpendicular as possible to the respective incident partial beam of the light source. In this way, it may be ensured that relatively small deflection angles are produced due to refraction when coupling light into the material of the TIR lens at the interfaces, resulting in a reduction in chromatic aberration due to the material-dependent dispersion, as well as in a high coupling efficiency into the material of the TIR lens. In the cross-sectional view of FIG. 3A, it may be clearly seen that the first surface 306 and the second surface 307 have a joint region 309 between the first surface 306 and the second surface 307. As indicated schematically in FIG. 3A, the joint region 309 has a surface shape that does not fall below a production radius and is designed in such a way that a light component from the spatially extended light source 302 that passes through the joint region 309 is deflected in as high a proportion as possible in the direction of the exit surface 310 and in particular not toward the reflector surface 308. This has the advantage that areas of high intensity (the hot spots previously mentioned) may be avoided in the resulting lighting distribution, which areas could otherwise occur if the joint region 309 were not carefully optimized and would have an adverse effect in the lighting distribution (cf. lighting distribution 140 of FIG. 1). This could be the case in particular for an uncontrollable production of the joint, that is to say, when production radii are required that fall below the possible production radii. Here, the light emanating from the light source 302 may be described by various beams. The beam 304 emerges from the lower angle range of the total beam and, in the frontal view of FIG. 3B, has an oval shape, which corresponds to the surface 306 in FIG. 3B. The beam 305 passes through the joint region 309. The beam 303 results from the higher angle range of the total beam and passes through the second surface 307 and has an oval-ring-shaped shape, which corresponds to the reflector surface 308 in the frontal view of FIG. 3B. With the design shown, a low chromatic aberration is realized, since the shape ensures that the beam 303 is mainly deflected by reflection at the surface 308, wherein the reflections are free from achromatic aberrations. The collimator shown in FIGS. 3A and 3B thus allows a spectrally homogeneous collimation with minimized chromatic aberration, a high efficiency of the light transmission with low residual divergence of less than 6°, and at the same time a compact design. In addition, the component is producible monolithically by means of an injection molding methods, wherein it is possible to produce a refractive diffuser structure, for example an achromatic refractive diffuser structure, likewise in one piece by means of the injection molding method. The diffuser structure will be explained below in connection with FIG. 4.

Figure 4:
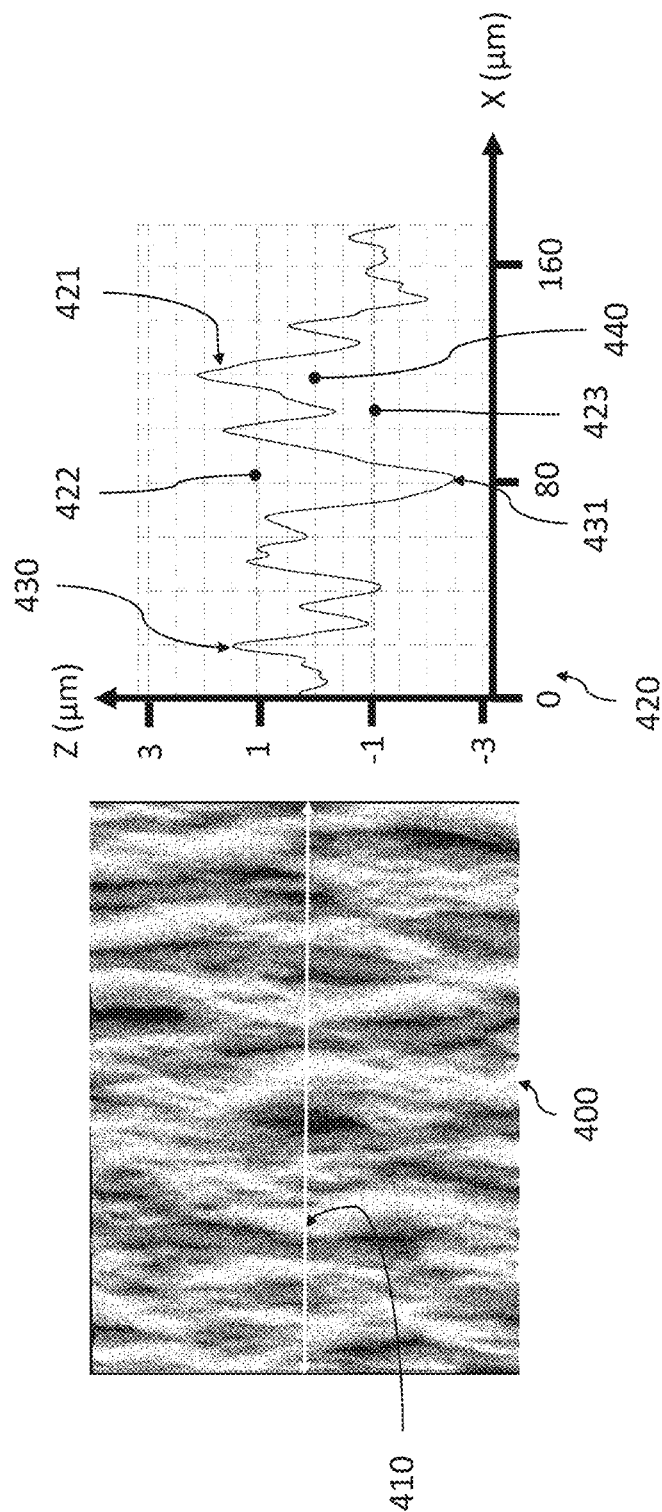
FIG. 4 shows a refractive diffuser according to an embodiment.

FIG. 4 shows a refractive diffuser 400 designed as an achromatic refractive diffuser. On the left-hand side of FIG.

4, a height contour 421 of the refractive diffuser is shown in diagram 420 as a function of the location along the path 410. The height contour here describes a topography function for the path 410. As may be seen from the height contour 421, the height profile changes in a continuously differentiable manner around an average value 440, wherein the standard deviation of the height contour 421 added to the average value of the height contour 422 and the standard deviation subtracted from the average value of the height contour 423 are additionally shown as reference. The height contour 421 here passes through local maxima 430 and minima 431. Since the height contour 421 is continuously differentiable, phase jumps in the wavefront of the transmitted light are avoided. This avoids technology-related zero orders of diffraction, and very good transmission properties, as described above, may be achieved. The above-described scalability of the diffuser offers further degrees of design freedom for the lighting distribution in the far field and, in particular, possibilities for generating an achromatic lighting distribution. This will be described below in connection with FIG. 5A and FIG. 5B.

Figure 5B:
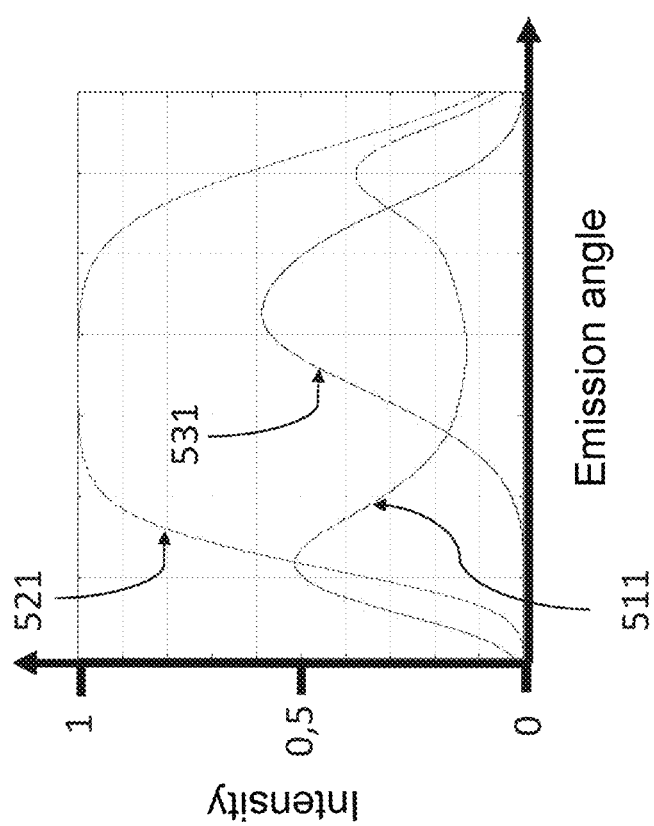
FIGS. 5A and 5B show a lighting distribution according to an embodiment.
Figure 5A:
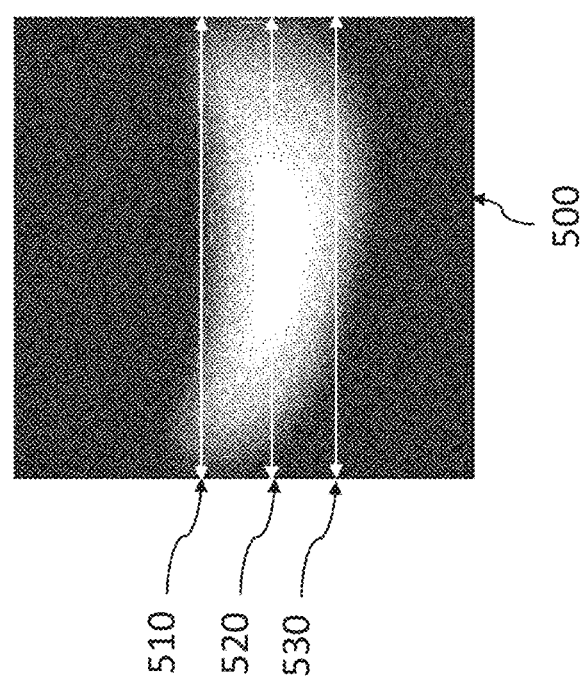

FIG. 5A and FIG. 5B show a lighting distribution according to an embodiment.

FIG. 5A shows a possible lighting distribution 500 of the lighting device. Such a lighting distribution 500 may be generated, for example, by the lighting device of FIG. 1. In the example of FIG. 5A, an asymmetric shape of the lighting distribution is achieved. The possible combination of the spatially extended light source with the aspherical TIR lens and the refractive diffuser results in numerous design options and degrees of design freedom for the lighting distribution 500, as described above and below. To illustrate the asymmetric lighting distribution 500 achieved, various intensity profiles 511, 521, 531 for sections 510, 520, 530 are plotted in FIG. 5B as a function of the emission angle.

FIG. 5B shows here the intensity of the white light for the sections of FIG. 5A in arbitrary units as a function of the emission angle in arbitrary units. The curve 511 here shows the intensity profile of the section 510, the curve 521 shows the intensity profile of the section 520, and the curve 531 shows the intensity profile of the section 530. As may be seen from the curves, different symmetric and asymmetric lighting distributions may be achieved in different areas of the lighting distribution 500. The curve 531 thus has an almost symmetric super-Gaussian shape, whereas the curve 521 has an almost symmetric top-hat-shaped super-Gaussian distribution. The curve 511, on the other hand, is strongly asymmetric and represents a superposition of two modified super-Gaussian intensity distributions. These intensity distributions may be established by optimizing the various components with great degrees of design freedom. In particular, very soft intensity transitions, as shown in the example of the intensity profile of curve 531, may be achieved, but sharper transitions, such as, for example, in the intensity profile of curve 521, are also possible.

Figure 6:
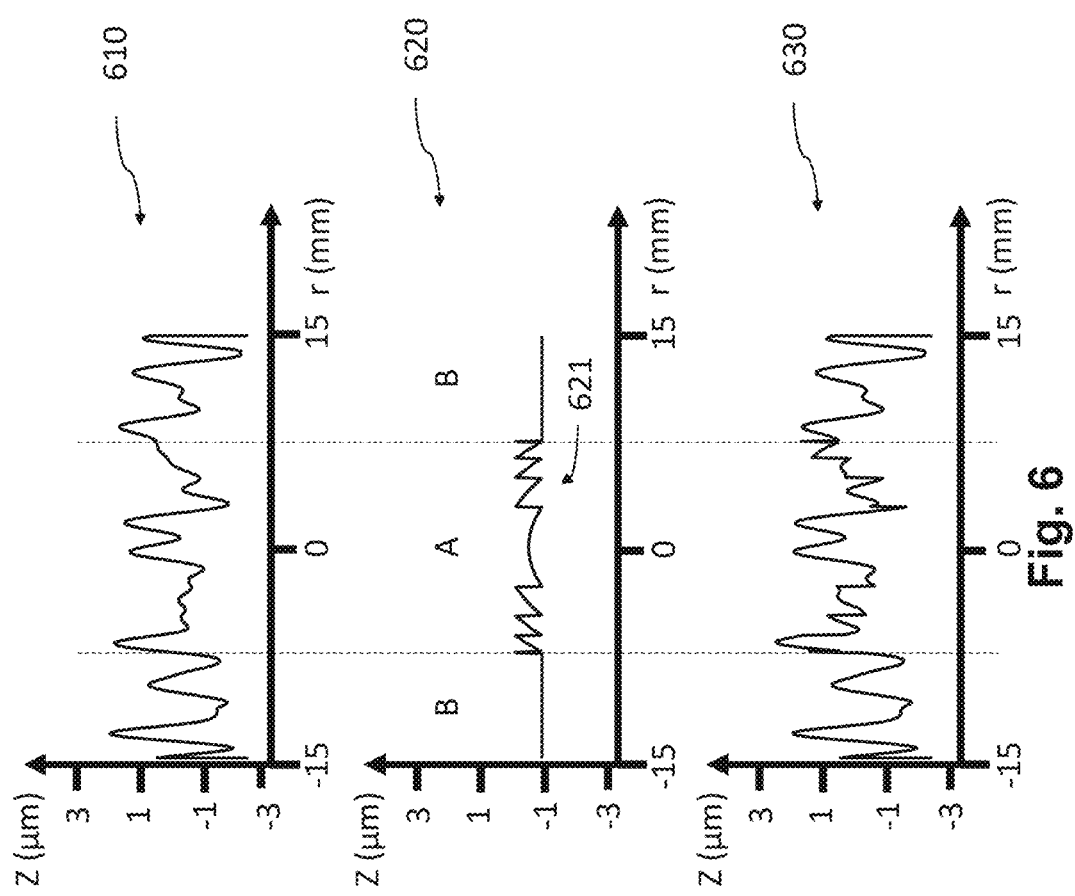
FIG. 6 shows an embodiment of an achromatic refractive diffuser with a hybrid structure.

FIG. 6 shows an embodiment of a refractive diffuser with a hybrid structure.

In some embodiments, at least part of the refractive diffuser may have a hybrid structure, as explained in the introductory part. Such hybrid structures may have the advantage that chromatic aberrations of the TIR lens may be compensated.

In the embodiment of FIG. 6, a height contour of an achromatic refractive diffuser 610 is shown by way of example as a function of the location along a path. As explained above, the diffuser may also be a refractive diffuser in other embodiments. The achromatic refractive diffuser shown may for example correspond to the achromatic refractive diffuser 400 of FIG. 4. The height profile of the achromatic refractive diffuser is now used as a starting point to provide a diffuser with a hybrid structure. For this purpose, a height profile of a globally acting diffractive structure 620 is superimposed with the height profile of the achromatic refractive diffuser 610. In FIG. 6, this is carried out as by way of example for a profile, wherein the height profiles 610, 620 are superposed by means of addition. A hybrid structure is obtained through the superposition of the height profiles of the achromatic refractive diffuser and the globally acting diffractive structure. A height contour of the hybrid structure 630 is also shown in FIG. 6 as an example.

In the example shown, the globally acting diffractive structure is limited to a region A. Region B, on the other hand, does not have a globally acting diffractive structure. In the example shown, the globally acting diffractive structure in region A is embodied as a Fresnel lens 621, which is designed to bring about $2\pi$ phase jumps in the light for a wavelength $\lambda$.

In other embodiments, region A may extend over other areas, and even fill the entire area so that region B is omitted, or several different regions such as A and B may be present. In particular, the structures at different locations may be designed for different center wavelengths. This may be advantageous, for example, if it is known that in specific regions there is a different spectral lighting distribution than in other areas. This may be the case, for example, due to chromatic aberration in optical components, for example in the TIR lens.

The hybrid structure is unchanged in region B compared to the original height profile of the achromatic refractive diffuser. The hybrid structure in region B may have the advantage that a color angle spectrum of the light collimated by the aspherical TIR lens may be reduced.

The diffuser with a hybrid structure may be arranged, for example, on the exit surface 310 of FIG. 3a and FIG. 3b, and region A may be selected such that the beam 304 passes through region A. The hybrid structure may then at least partially compensate for a chromatic aberration which may arise, for example, due to refraction at the surface 306. The quality of the lighting distribution may be further improved as a result. At the same time, the hybrid structure, as described above, makes it possible to avoid the occurrence of zero orders of diffraction in the lighting distribution.

Thus, by means of refractive diffusers and TIR reflectors, various types of lighting devices for vehicles, in particular front headlights, but also direction indicators, reversing lights, fog lights, brake lights, and the like, having the desired lighting distributions may be provided, which allows a great design freedom.

What is claimed is:

1. A lighting device, comprising:
   a spatially extended light source with a light-emitting surface greater than 0.5 mm$^2$,
   an aspherical TIR lens, which is configured to collimate light from the spatially extended light source, and
   a refractive diffuser, which is configured to generate a lighting distribution on the basis of the collimated light,
   wherein the spatially extended light source has a shape comprising a first length in a first direction and a second length in a second direction, which differs from the first direction,
   wherein the first length is greater than the second length, and wherein the aspherical TIR lens has a first extent in the first direction and a second extent in the second direction, wherein the first extent is greater than the second extent.

2. The lighting device as claimed in claim 1, wherein the refractive diffuser is an achromatic refractive diffuser.

3. The lighting device as claimed in claim 1, wherein the refractive diffuser is configured to receive the collimated light with a residual divergence, wherein the refractive diffuser is configured to generate the lighting distribution on the basis of the collimated light with the residual divergence.

4. The lighting device as claimed in claim 1, wherein the achromatic refractive diffuser has an optical diffuser surface that is configured to provide the lighting distribution on the basis of the collimated light, wherein the diffuser surface is continuously differentiable.

5. The lighting device as claimed in claim 4, wherein the diffuser surface has stochastically distributed structures with convex and concave structure parts,
wherein the structure parts have lateral dimensions of 15 μm-500 μm.

6. The lighting device as claimed in claim 1, wherein the lighting distribution has one or a plurality of the following shapes:
a symmetric shape, an asymmetric shape, a round shape, a square shape, an elliptical shape.

7. The lighting device as claimed in claim 1, wherein the lighting distribution has one or a plurality of the following intensity distributions:
a homogeneous intensity distribution, a top-hat-shaped intensity distribution, a Gaussian intensity distribution, a super-Gaussian intensity distribution.

8. The lighting device as claimed in claim 1, wherein the refractive diffuser comprises at least one region which contains a hybrid structure, wherein the hybrid structure comprises a combination of an achromatic refractive diffuser with a globally acting diffractive structure.

9. The lighting device as claimed in claim 8, wherein the globally acting diffractive structure comprises a Fresnel lens.

10. The lighting device as claimed in claim 1, wherein the aspherical TIR lens and the refractive diffuser are formed in one piece as one component.

11. The lighting device as claimed in claim 10, wherein the refractive diffuser is formed in one piece with an exit surface of the aspherical TIR lens.

12. The lighting device as claimed in claim 1, wherein the aspherical TIR lens and/or the refractive diffuser are produced by way of an injection molding method.

13. The lighting device as claimed in claim 1, wherein the lighting device is embodied as a lighting device for a vehicle.

14. A lighting device, comprising:
a spatially extended light source with a light-emitting surface greater than 0.5 mm$^2$,
an aspherical TIR lens, which is configured to collimate light from the spatially extended light source, and
a refractive diffuser, which is configured to generate a lighting distribution on the basis of the collimated light, wherein the aspherical TIR lens is not rotationally symmetric and wherein the aspherical TIR lens is located in a solid angle range, starting from a center point of the spatially extended light source, wherein the solid angle range substantially comprises the half-space around the spatially extended light source.

15. A lighting device, comprising:
a spatially extended light source with a light-emitting surface greater than 0.5 mm$^2$,
an aspherical TIR lens, which is configured to collimate light from the spatially extended light source, and
a refractive diffuser, which is configured to generate a lighting distribution on the basis of the collimated light, wherein the aspherical TIR lens is configured to generate a substantially rotationally symmetric collimation of the spatially extended light source.

16. The lighting device as claimed in claim 15, wherein the spatially extended light source has a shape comprising a first length in a first direction and a second length in a second direction, which differs from the first direction, wherein the first length is greater than the second length.

17. A lighting device, comprising:
a spatially extended light source with a light-emitting surface greater than 0.5 mm$^2$,
an aspherical TIR lens, which is configured to collimate light from the spatially extended light source, and
a refractive diffuser, which is configured to generate a lighting distribution on the basis of the collimated light, wherein the aspherical TIR lens has an axis, a first surface, a second surface, an exit surface, and a reflector surface, wherein:
the axis extends through the spatially extended light source,
the exit surface is planar and extends perpendicularly to the axis, wherein the exit surface provides the collimated light,
the first surface has a bi-aspheric shape and intersects the axis,
the second surface has a free form and does not intersect the axis and
wherein the reflector surface has a paraboloid shape.

18. The lighting device as claimed in claim 17, wherein the aspherical TIR lens comprises a joint region between the first and the second surface, wherein the joint region has a surface shape that does not fall below a production radius and is designed in such a way that a light component from the spatially extended light source that passes through the joint region is deflected in such a way that the light component substantially does not influence the lighting distribution.

19. The lighting device as claimed in claim 18, wherein a proportion of at least 70% of the light component is directed in the direction of the exit surface and not toward the reflector surface.

20. The lighting device as claimed in claim 19, wherein the proportion is more than 95%.

21. The lighting device as claimed in one of claim 17, wherein the free form of the second surface is defined by means of Q polynomials.

22. A lighting device, comprising:
a spatially extended light source with a light-emitting surface greater than 0.5 mm$^2$,
an aspherical TIR lens having a first surface, a second surface, and an axis, wherein the axis extends through the spatially extended light source, the first surface has a bi-aspheric shape and intersects the axis, and the second surface has a free form and does not intersect the axis, the aspherical TIR lens configured to collimate light from the spatially extended light source, and
a refractive diffuser, which is configured to generate a lighting distribution on the basis of the collimated light, wherein the refractive diffuser comprises at least one region which contains a hybrid structure, wherein the hybrid structure comprises a combination of an achromatic refractive diffuser with a globally acting diffractive structure, and wherein the at least one region fills at least part of a projection of the first surface and/or the second surface onto the refractive diffuser.

* * * * *